C. W. WEISS.
POWER TRANSMISSION DEVICE.
APPLICATION FILED AUG. 7, 1913.
1,141,508.
Patented June 1, 1915.
4 SHEETS—SHEET 3.
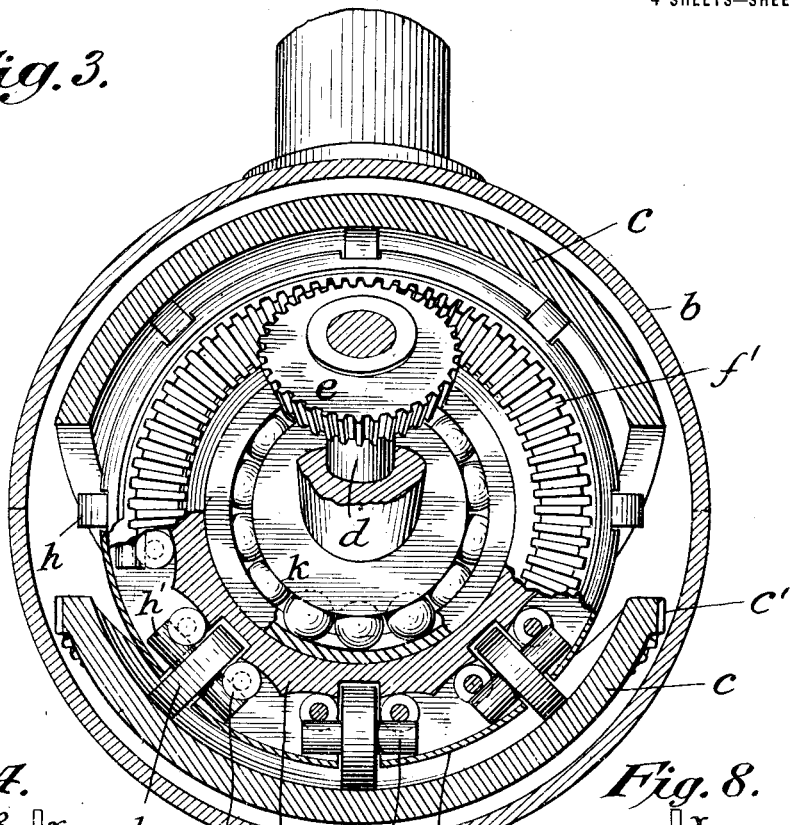
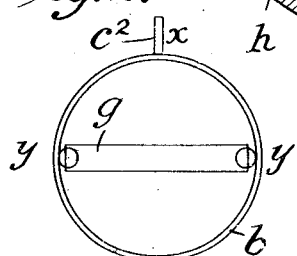
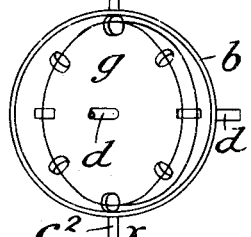
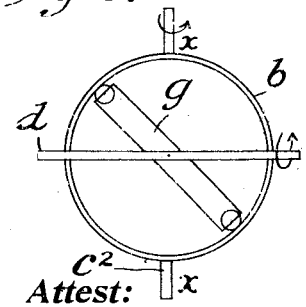
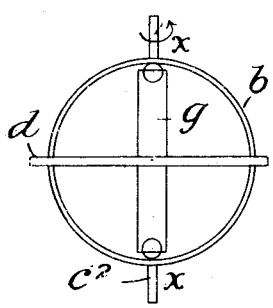
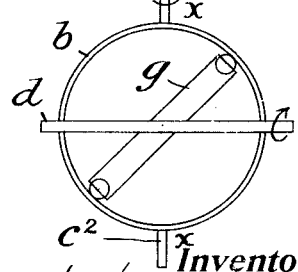
Attest:
Inventor:
by Carl W. Weiss
Redding, Greeley & Goodlett
Atty

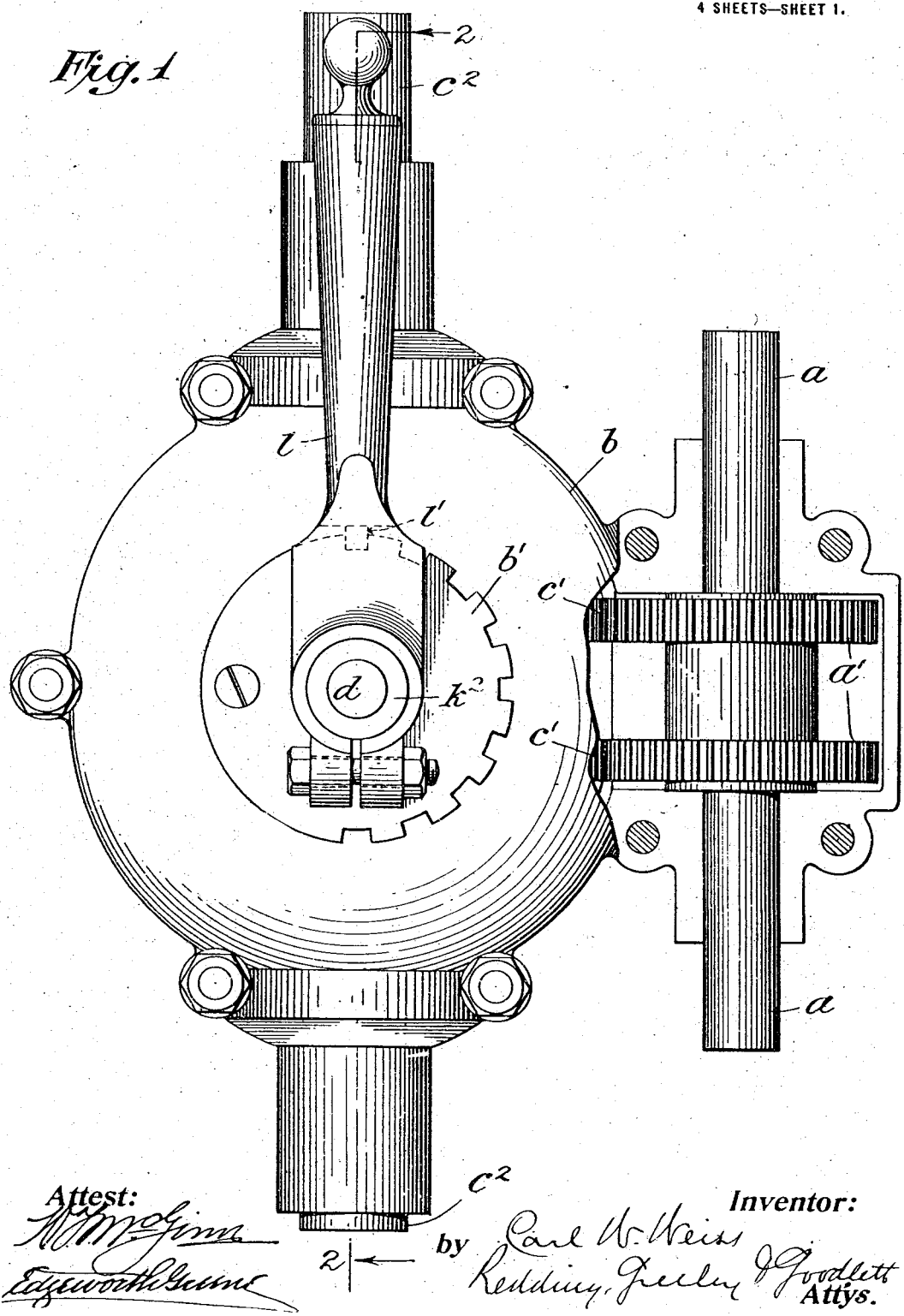

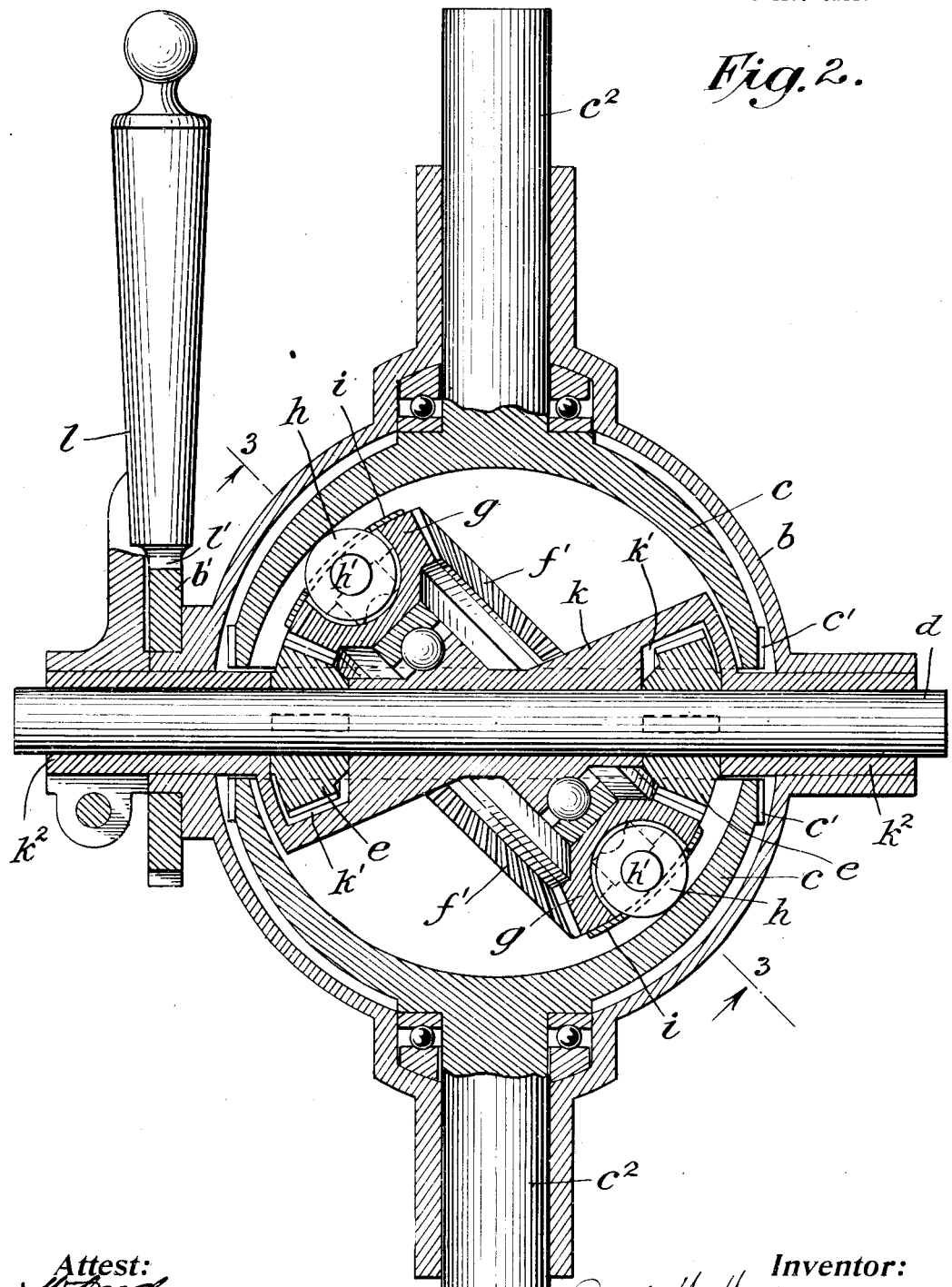

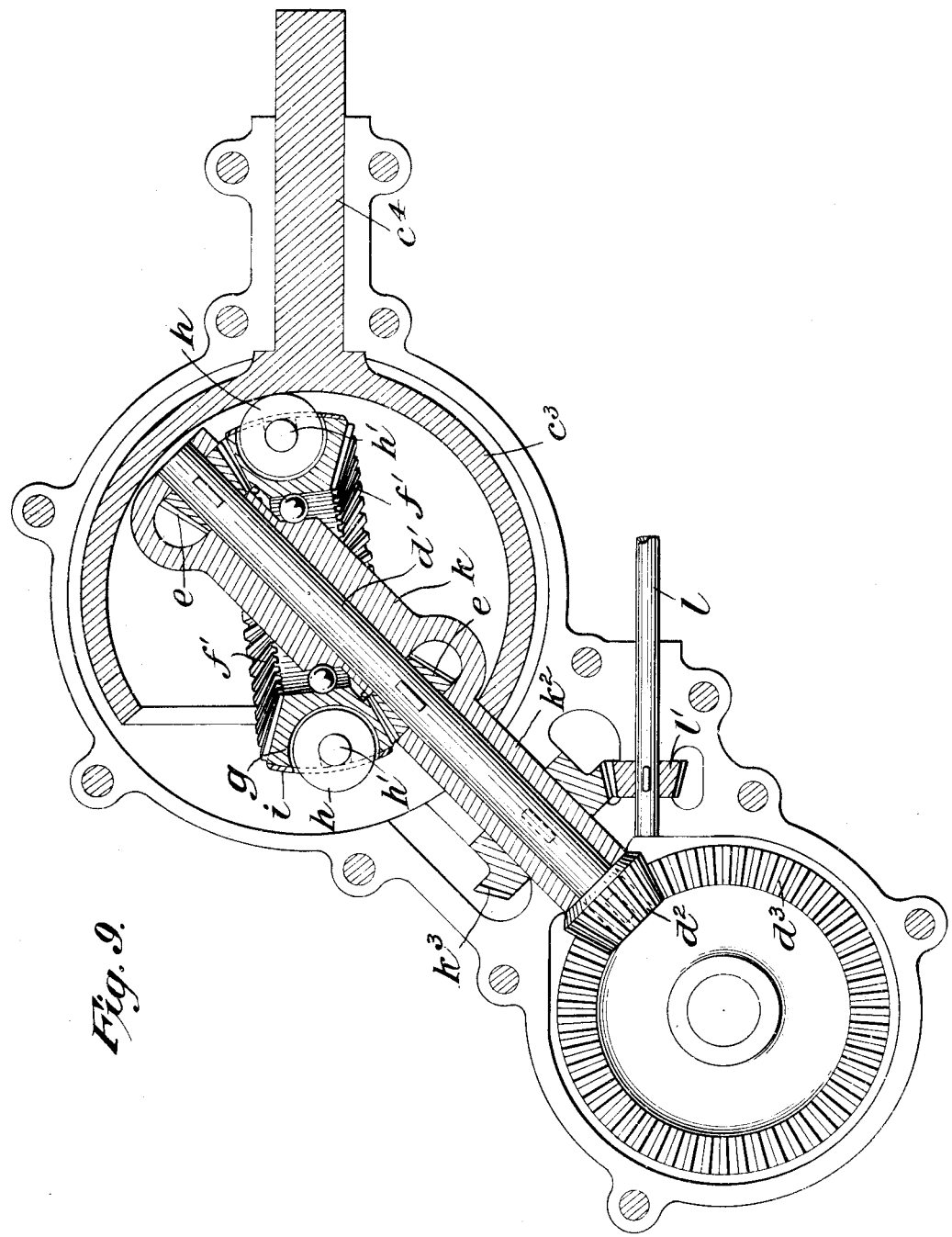

UNITED STATES PATENT OFFICE.

CARL W. WEISS, OF NEW YORK, N. Y.

POWER-TRANSMISSION DEVICE.

1,141,508.　　　　Specification of Letters Patent.　　Patented June 1, 1915.

Application filed August 7, 1913. Serial No. 783,511.

*To all whom it may concern:*

Be it known that I, CARL W. WEISS, a citizen of the United States, residing in the borough of Brooklyn of the city of New York, in the county of Kings, in the State of New York, have invented certain new and useful Improvements in Power-Transmission Devices, of which the following is a specification, reference being had to the accompanying drawings, which form a part hereof.

In another application for Letters Patent of the United States filed May 14, 1913, Serial No. 767,604, there is shown and described a variable power transmission device of the same general type as that to which the present invention relates. This type of transmission does not comprise toothed gears, is not a frictional drive, in the ordinary understanding of that expression, is not a belt drive and is not hydraulic, yet is capable of yielding any speed ratio between its extremes, is positive and is not subject to loss of efficiency. The power is transmitted through a nutating body which receives a movement of rotation on its own axis which is proportional to the angular displacement of the axis of rotation with respect to the axis of nutation, the speed ratio being therefore varied by varying such angle of displacement. In the present instance the transmission device not only possesses the characteristics enumerated above but has also within itself a capacity for reverse motion, whereas in the former case the movement of the driven part is always in the same direction as that of the driver; in the present instance that member of the device which might be termed broadly the nutating body has only a partial movement of nutation and then only when a variation in the speed ratio is to be effected. This body, which is aptly termed a mutor, since it is a shiftable speed changing or controlling member and effects the change of speed ratio, coöperates with a spherical bearing which is operatively connected with one of the two primary elements of the device, the driver and the driven part, and has an operative connection with the other of said elements. Means are also provided whereby the relation of the mutor to the spherical bearing or clutch surface can be varied, that is, whereby the angular distance of the point or line of contact of the mutor and the spherical bearing, with respect to the axis of rotation of the spherical bearing can be changed at will for the purpose of varying the speed ratio. As this point or line of contact can be made to pass through the axis of rotation, from one side to the other, it is possible to secure a reversal of the direction of rotation of the driven part with respect to the driver.

In the accompanying drawings in which are illustrated convenient and practical embodiments of the invention—Figure 1 is a view of such embodiment in elevation, with a portion of the casing broken away. Fig. 2 is a view in section on the plane indicated by the line 2—2 of Fig. 1. Fig. 3 is a view in section on the plane indicated by the line 3—3 of Fig. 2, parts being broken away. Figs. 4, 5, 6 and 7 are diagrammatic views which illustrate, for the purpose of enabling the operation of the device to be understood more readily, several different positions of the mutor with respect to the spherical coöperating member. Fig. 8 is a diagrammatic view, similar to Figs. 4, 5, 6 and 7, but representing the position of the mutor when the carrier is turned $90°$ from the position indicated in Fig. 2. Fig. 9 is a view similar to Fig. 2 but showing a modification of the structure shown in Fig. 2.

In the embodiment of the invention illustrated in the drawings it may be assumed that power is derived from a countershaft $a$ which is mounted in suitable bearings in a portion of the casing $b$ and carries gears $a'$ $a'$ which engage severally with gears $c'$ $c'$ which are formed on or secured to internally spherical coöperating bodies $c$ $c$, which are supported by short shafts $c^2$ mounted in suitable bearings in the casing $b$. Power might be applied in any convenient manner to the short shaft $c^2$ or to either of them and although two are employed for the sake of securing a better operation of the device, as will become more clearly apparent hereinafter, one of such spherical bearing bodies or coöperating bodies might be employed alone. Therefore either of the shafts $c^2$ might be considered as the driver or, since, except for one position, power might be transmitted through the device from either terminal element to the other, either shaft $c^2$ might be considered as the driven part. Also supported by the casing $b$, but at right angles to the axis of the shaft $c^2$, is the other terminal element shaft $d$, of the device, which is preferably, in the construction shown, the driven part, although it might be the driver. Upon the shaft $d$ are secured beveled pinions $e$, two such gears being provided although one might suffice. These pinions are engaged, respectively, by beveled gears $f'$ which are formed on or secured to the mutor $g$. The latter which is an annular body mounted as hereinafter described, carries clutch bodies $h$ for coaction with the internally spherical bearing surface of the coöperating bodies or drivers $c$. In the construction shown the clutch bodies $h$ are formed as clutch rollers mounted on short shafts $h'$, the latter being mounted in turn upon grooved rollers $h^2$ seated in suitable bearings in the mutor $g$. The mutor is suitably recessed to receive these clutch rollers so that each clutch roller may have a limited movement in the direction of its axis on a chord of the arc of the mutor. Lateral displacement of each roller increases its radial distance from the axis of the mutor and therefore causes it to coact with the internally spherical bearing or clutch surface of the coöperating body $c$ as is usual in ball or roller clutches. A shield $i$ may be provided to retain the clutch rollers in their proper positions in the mutor $g$.

The mutor is mounted so as to rotate freely about an axis which intersects the axis of the coöperating bodies at the center of the spherical bearing surfaces. The axis of the shaft $d$ also intersects the axis of the coöperating bodies at the center of the spherical bearing surfaces. The mutor is mounted by suitable bearings, so as to rotate freely, on a carrier $k$ which in turn is mounted on a shaft $d$ so that it may receive a movement of angular adjustment about the shaft. The axis of the bearing of the mutor $g$ is oblique to the axis of the shaft $d$, being preferably at an angle of about 45° with respect thereto, that angle being about the largest which is possible within the limits of practical construction. The carrier $k$ is suitably recessed, as at $k'$, to receive the pinions $e$ and has at one or at each end a sleeve $k^2$ which has a bearing in the casing $b$. At one end the carrier $k$ may have secured thereto a handle $l$ by which the angular position of the carrier may be adjusted, the handle having a latch $l'$ for engagement with a notched sector $b'$ which is secured to the casing $b$.

In describing the operation of the device it may be assumed that the internally spherical bearing or coöperating body is a complete sphere as indicated in Figs. 4, 5, 6, 7 and 8, and that it rotates upon the axis $x$ $x$ in the direction indicated by the curved arrows. If it be now assumed that the mutor $g$ stands in the position represented in Fig. 4, with its axis coinciding with the axis $x$ $x$ of the spherical bearing and with its clutch members in contact with the spherical bearing at its equator $y$ $y$ (which is a purely theoretical and practical impossible position) it will be obvious that the mutor would rotate with the spherical bearing or coöperating body, at the same speed and in the same direction, the clutch bodies coupling the mutor and the coöperating body positively. If it be now assumed that the mutor $g$ is in the position represented in Fig. 6, with its axis at right angles to the axis of the coöperating body $b$ and coincident with the axis of the shaft $d$, then the two clutch bodies which contact with the coöperating body in the axis of rotation will be stationary and each of the other clutch bodies will rotate on its own axis without producing any movement of the mutor itself, the path described by each stationary clutch body on the rotating spherical bearing surface being a circle of the sphere parallel with the equator. The position of the mutor indicated in Fig. 6 is also purely theoretical and practically impossible since it cannot be seen edgewise except when it occupies the position indicated in Figs. 5 and 7. The true presentation of the mutor to the eye at this time is indicated in Fig. 8. If it be assumed that the mutor is in an intermediate position on one side of the polar axis $x$ $x$, as shown in Fig. 5, then, as will be obvious, the mutor will receive a movement of rotation about its own axis with a speed which is intermediate between the zero speed of the position indicated in Fig. 6 and the theoretical maximum speed of the position indicated in Fig. 4. At the point where each clutch body approaches most closely to the polar axis of the coöperating body it will have, at that mathematical instant, a speed which is equal to the circumferential speed of the point of the coöperating body with which it is at that instant in contact and it will have no movement of rotation on its own axis, but for every other position each clutch body will have a movement of rotation on its own axis which increases with its proximity to the equator of the coöperating body. If the mutor be shifted to a position on the other side of the axis of the coöperating body, as indicated in Fig. 7, then, as will be readily understood, the direction of rotation will be reversed. In the theoretical position indicated in Fig. 4 each clutch body has no movement of rotation on its own axis while the mutor itself rotates on its axis at the maximum speed; that in the position indicated in Fig. 6 each clutch body except that one which contacts with the coöperating body in the axis of rotation of the coöperating body, rotates freely on its own axis without producing any movement of rotation of the mutor, the entire movement of rotation of the coöperating body being taken up in the rotation of the clutch bodies on their own axes; and that for every intermediate position the rotary movement of the coöperating body is expended partly in rotating each clutch body in contact therewith on its own axis and partly in producing, through the clutching action of the clutch body with the coöperating body, a movement of rotation of the mutor on its own axis. For any given angular position of the mutor the relation of the two components of the force which acts upon the clutch bodies varies with the position of the particular clutch body between the pole and the equator and is constantly changing with the movement of the particular clutch body about the axis of the mutor, the component which produces rotation of the clutch body on its own axis being maximum when the clutch body is at the equator and decreasing as the clutch body approaches the pole, while the component which produces movement of the clutch body about the axis of the mutor increases as the clutch body approaches the polar axis. As the circumferential speed of the point with which a clutch body is in contact decreases as the clutch body approaches the polar axis, the net result is a uniform movement of rotation of the mutor about its own axis, the rate of which is dependent upon the angular position of the mutor about the axis of the carrier on which the mutor has a movement of nutation.

The movement of nutation of the mutor is not constant nor complete, but is determined by the movement of the handle $l$ as already described.

The movement of rotation of the mutor, varied as already described, is imparted to the driven shaft $d$ through the gears $f'$ and the pinions $e$, as already described, so that the speed ratio between the driver $c^2$ and the driven part $d$ is determined by adjustment of the handle $l$. The position of the handle represented in Figs. 1 and 2 yields a maximum speed of the driven part $d$, or a minimum speed ratio, with movement in one direction; movement of the handle to a position at right angles to that shown in Fig. 1 yields a minimum or zero speed of the driven part; and a further movement of the handle through 90°, or through 180° from the position shown in Fig. 1, yields a maximum speed of the driven part but in the opposite direction.

It will be obvious, as already indicated, that for all angular positions which yield zero speed and the positions adjacent to it on either side, power might be applied to the shaft $d$, yielding a speed of rotation of either shaft $c^2$ or of the shaft $a$, which would then become the driven part or parts, greater than the speed of rotation of the shaft $d$. It will also be obvious in the zero position of the mutor each clutch body at the polar axis of the coöperating body would act as a positive clutch to prevent rotation of the mutor on its own axis.

It is obvious that a single coöperating body, less than a hemisphere, might be employed alone, although it is obviously desirable to employ opposite coöperating bodies as shown. As it is practically impossible to let either coöperating body, in the construction shown in the drawings, be a full hemisphere, there must necessarily be a gap between the edges of the two coöperating bodies over which the clutch bodies must pass. This is undesirable but does not constitute a serious practical difficulty since a considerable number of clutch bodies may be mounted on the mutor so that only a small portion of the clutch bodies are out of contact with the coöperating bodies at any given time.

In the modification shown in Fig. 9 the two nearly hemispherical shells $c$ above referred to are replaced by a single shell $c^3$ which is more than a hemisphere and is secured to a shaft $c^4$ which may be regarded as the driving shaft. A driven shaft $d'$ in this instance is shown as carrying a beveled pinion $d^2$ which meshes with a beveled gear $d^3$. It is placed, not at right angles to the axis of the driving shaft $c^4$, but obliquely with respect thereto and carries, as before, two beveled pinions $e$ which are engaged respectively by beveled gears $f'$ formed on or secured to the mutor $g$. The latter, as before, carries clutch rollers $h$, mounted on short shafts $h'$ for coaction with the internally spherical bearing surface of the coöperating body or driving shell $c^3$. Each clutch roller has a limited movement in the direction of its axis on a chord of the arc of the mutor and the rollers are retained by a shield $i$. The mutor, as before, is mounted so as to rotate freely about an axis which intersects the axis of the driving shaft at the center of the spherical bearing surface of the shell $c^3$, and is mounted on a carrier $k$ which is suitably recessed to receive the pinions $e$ and has a sleeve $k^2$ which has a bearing in the casing and has secured thereto a beveled gear $k^3$ which is engaged by a beveled gear $l'$ on the controlling shaft $l$ by which the carrier is rotated about its axis for the purpose of placing the mutor in the required position within the shell $c^3$. It will be understood that the operation of this form of the transmission device is substantially the same as that of the form previously described. When the mutor is in the position shown in Fig. 9, which is the extreme reverse position, the mutor is rotated at slow speed, that roller $h$ which is nearest in position to the axis of the shaft $c^4$ at any instant having a movement substantially in the direction of its axis and at a speed which is determined substantially by the distance of its line of contact from the axis of the shell. The roller which is then at right angles to the roller just referred to will have its movement resolved into a very large component of rotation on its own axis and a correspondingly small component of movement along the circumference of the mutor. If the position of the carrier is changed slightly, so that the central plane of the mutor includes the axis of rotation of the shell, the rotation of the mutor will cease. If the movement of the carrier is continued until the mutor stands nearly at right angles to the axis of rotation of the shell, all of the rollers $k$, contacting with the spherical surface near its equator, will have no movement of rotation about their own axes but will revolve about the axis of the mutor at the same speed as that of a point near the equator of the shell. The rotation of the mutor on its own axis in any position will be transmitted to the driven shaft $d'$ and the speed of rotation will be dependent upon the angular position of the mutor with respect to the axis of rotation of the driving shell.

Limitations of construction impose a narrow limit of speed in a reverse direction, in the structure shown in Fig. 9 as compared with the structure previously described, but in other respects the structure shown in Fig. 9 has some advantages over the structure previously described, especially in the fact that at high speeds all of the rollers carried by the mutor are in contact with the shell, which they leave only at low speeds.

Various other changes may be made in the details of the construction and arrangement of the mechanisms shown and described herein and the invention, therefore, is not to be limited to the particular construction shown.

I claim as my invention:—

1. A power transmission device comprising a driving element and a driven element, a coöperating body operatively connected with one of said elements, a mutor, clutch members interposed between the coöperating body and the mutor, and operating connections between the mutor and the other of said first named elements.

2. A power transmission device comprising a driving element and a driven element, a coöperating body operatively connected with one of said elements and having a spherical bearing surface, a rotatable mutor mounted concentrically with the coöperating body and with its axis oblique to the axis of the coöperating body, clutch members interposed between the mutor and the spherical bearing surface of the coöperating body, and operating connections between the mutor and the other of said first named elements.

3. A power transmission device comprising a driving element and a driven element, a coöperating body operatively connected with one of said elements and having a spherical bearing surface, a rotatable mutor mounted concentrically with the coöperating body and with its axis oblique to the axis of the coöperating body, rolling clutch members interposed between the mutor and the spherical bearing surface of the coöperating body, and operating connections between the mutor and the other of said first named elements.

4. A power transmission device comprising a driving element and a driven element, a coöperating body operatively connected with one of said elements and having a spherical bearing surface, a rotatable mutor mounted concentrically with the coöperating body and with its axis oblique to the axis of the coöperating body, rolling clutch members mounted on the mutor and coacting with the spherical bearing surface of the coöperating body, and operating connections between the mutor and the other of said first named elements.

5. A power transmission device comprising a driving element and a driven element, a coöperating body operatively connected with one of said elements, a mutor, clutch members interposed between the coöperating body and the mutor, means to vary the relative angular position of the mutor with respect to the coöperating body, and operating connections between the mutor and the other of said first named elements.

6. A power transmission device comprising a driving element and a driven element, a coöperating body operatively connected with one of said elements and having a spherical bearing surface, a rotatable mutor mounted concentrically with the coöperating body and with its axis oblique to the axis of the coöperating body, rolling clutch members interposed between the mutor and the spherical bearing surface of the coöperating body, means to vary the relative angular position of the mutor with respect to the coöperating body, and operating connections between the mutor and the other of said first named elements.

7. A power transmission device comprising a driving element and a driven element, a coöperating body operatively connected with one of said elements and having a spherical bearing surface, a freely rotatable mutor, clutch members interposed between the mutor and the spherical bearing surface of the coöperating body, a carrier upon which the mutor is mounted concentrically with the coöperating body and with its axis oblique to the axis of the coöperating body, and operating connections between the mutor and the other of said first named elements.

8. A power transmission device comprising a driving element and a driven element, a coöperating body operatively connected with one of said elements and having an internally spherical bearing surface, a rotatable mutor mounted concentrically with the coöperating body and with its axis oblique to the axis of the coöperating body, clutch members interposed between the mutor and the spherical bearing surface of the coöperating body, and operating connections between the mutor and the other of said first named elements.

9. A power transmission device comprising a driving element and a driven element, a coöperating body operatively connected with one of said elements and having an internally spherical bearing surface, a rotatable mutor mounted concentrically with the coöperating body and with its axis oblique to the axis of the coöperating body, rolling clutch members mounted on the mutor and coacting with the internally spherical bearing surface of the coöperating body, and operating connections between the mutor and the other of said first named elements.

10. A power transmission device comprising a driving element and a driven element, a coöperating body operatively connected with one of said elements and having an internally spherical bearing surface, a rotatable mutor mounted concentrically with the coöperating body and with its axis oblique to the axis of the coöperating body, rolling clutch members interposed between the mutor and the spherical bearing surface of the coöperating body, means to vary the relative angular position of the mutor with respect to the coöperating body, and operating connections between the mutor and the other of said first named elements.

11. A power transmission device comprising a driving element and a driven element with their axes intersecting at right angles, a coöperating body operatively connected with one of said elements, a rotatable mutor mounted concentrically with the coöperating body and with its axis intersecting the axes of the two first named elements at their point of intersection and obliquely, clutch members interposed between the mutor and the spherical bearing surface of the coöperating body, and operating connections between the mutor and the other of said first named elements.

12. A power transmission device comprising a driving element and a driven element with their axes intersecting at right angles, a coöperating body operatively connected with one of said elements, a rotatable mutor mounted concentrically with the coöperating body and with its axis intersecting the axes of the two first named elements at their point of intersection and obliquely, clutch members interposed between the mutor and the spherical bearing surface of the coöperating body, means to vary the relative angular position of the mutor with respect to the coöperating body, and operating connections between the mutor and the other of said first named elements.

13. A power transmission device comprising a driving element and a driven element with their axes intersecting at right angles, a coöperating body operatively connected with one of said elements, a rotatable mutor mounted concentrically with the coöperating body and with its axis intersecting the axes of the two first named elements at their point of intersection and obliquely, clutch members interposed between the mutor and the spherical bearing surface of the coöperating body, a carrier upon which the mutor is rotatably mounted, and means to vary the relative angular position of the carrier about its axis.

14. A power transmission device comprising a driving shaft, an internally spherical shell carried therewith, a driven shaft at right angles with the driving shaft, a carrier mounted on said shaft and angularly adjustable thereon, an annulus freely rotatable on the carrier, driving connections between the annulus and the driven shaft, and clutch members interposed between the annulus and the internally spherical shell.

15. A power transmission device comprising a driving shaft, an internally spherical shell carried therewith, a driven shaft at right angles with the driving shaft, a carrier mounted on said shaft and angularly adjustable thereon, an annulus freely rotatable on the carrier, driving connections between the annulus and the driven shaft, rolling clutch members mounted on the carrier and coacting with the internally spherical shell.

16. A power transmission device comprising a driving shaft, an internally spherical shell carried therewith, a driven shaft at right angles with the driving shaft, a carrier mounted on said shaft and angularly adjustable thereon, an annulus freely rotatable on the carrier, driving connections between the annulus and the driven shaft, including a beveled gear formed on the annulus and a beveled pinion mounted on the driven shaft and in mesh with said beveled gear on the annulus, and clutch members interposed between the annulus and the internally spherical bearing.

17. A power transmission device comprising a supporting casing, a countershaft mounted in the casing and having gears thereon, internally spherical shells mounted in said casing to rotate upon axes parallel with the countershaft and having gears formed thereon to mesh with the gears on the countershaft, a driven shaft extended through the casing at right angles with the countershaft, a carrier sleeved loosely on the driven shaft, an annulus mounted to rotate freely on the carrier with its axis oblique to the axis of the driven shaft, a gear secured to the driven shaft and a gear secured to the annulus and in mesh with the gear of the driven shaft, and clutch bodies interposed between the annulus and the internally spherical shells to coöperate therewith.

18. A power transmission device comprising a supporting casing, a countershaft mounted in the casing and having gears thereon, internally spherical shells mounted in said casing to rotate upon axes parallel with the countershaft and having gears formed thereon to mesh with the gears on the countershaft, a driven shaft extended through the casing at right angles with the countershaft, a carrier sleeved loosely on the driven shaft, an annulus mounted to rotate freely on the carrier with its axis oblique to the axis of the driven shaft, a gear secured to the driven shaft and a gear secured to the annulus and in mesh with the gear of the driven shaft, clutch bodies interposed between the annulus and the internally spherical shells to coöperate therewith, and means to vary the angular position of the carrier about the driven shaft.

This specification signed and witnessed this fourth day of August A. D., 1913.

CARL W. WEISS.

Signed in the presence of—
W. B. GREELEY,
WORTHINGTON CAMPBELL.